United States Patent [19]

Kjelgaard et al.

[11] 3,978,681
[45] Sept. 7, 1976

[54] METHOD AND APPARATUS FOR THE ADIABATIC EXPANSION OF LIQUID ANHYDROUS AMMONIA

[75] Inventors: William L. Kjelgaard; Paul M. Anderson, both of State College, Pa.

[73] Assignee: Research Corporation, New York, N.Y.

[22] Filed: Sept. 16, 1974

[21] Appl. No.: 506,516

[52] U.S. Cl. .................................... 62/51; 55/189; 62/54; 62/512; 111/7
[51] Int. Cl.$^2$ ......................................... F17C 7/02
[58] Field of Search ............ 159/2 R, 3, 6 R; 62/50, 62/51, 54, 512, 503; 55/159, 189; 111/7

[56] References Cited
UNITED STATES PATENTS

| | | | |
|---|---|---|---|
| 1,516,314 | 11/1924 | Sebald | 159/2 R |
| 2,512,869 | 6/1950 | McBroom | 62/503 |
| 2,612,760 | 10/1952 | Baggette et al. | 111/7 |
| 2,843,534 | 7/1958 | Harper | 159/6 R |

Primary Examiner—William F. O'Dea
Assistant Examiner—Ronald C. Capossela
Attorney, Agent, or Firm—Cooper, Dunham, Clark, Griffin & Moran

[57] ABSTRACT

Cold anhydrous ammonia, preferably cold liquid anhydrous ammonia at substantially ambient or atmospheric pressure is applied to feed grains, forages and anaerobically fermentable plant material to supply thereto and provide therein non-protein nitrogen (NPN). The cold anhydrous ammonia is obtained by supplying a stream of ambient temperature, pressurized anhydrous liquid ammonia to an expansion chamber for expansion therein to provide the cold anhydrous ammonia. Cold anhydrous ammonia, preferably substantially only cold liquid anhydrous ammonia, is recovered from the expansion chamber operated under substantially adiabatic conditions, at a temperature in the range −30°F. to about −17°F. and at substantially ambient or atmospheric pressure, such as at a pressure in the range 1 pound per square inch below atmospheric pressure up to about 5 pounds per square inch atmospheric pressure.

4 Claims, 3 Drawing Figures

U.S. Patent  Sept. 7, 1976  3,978,681
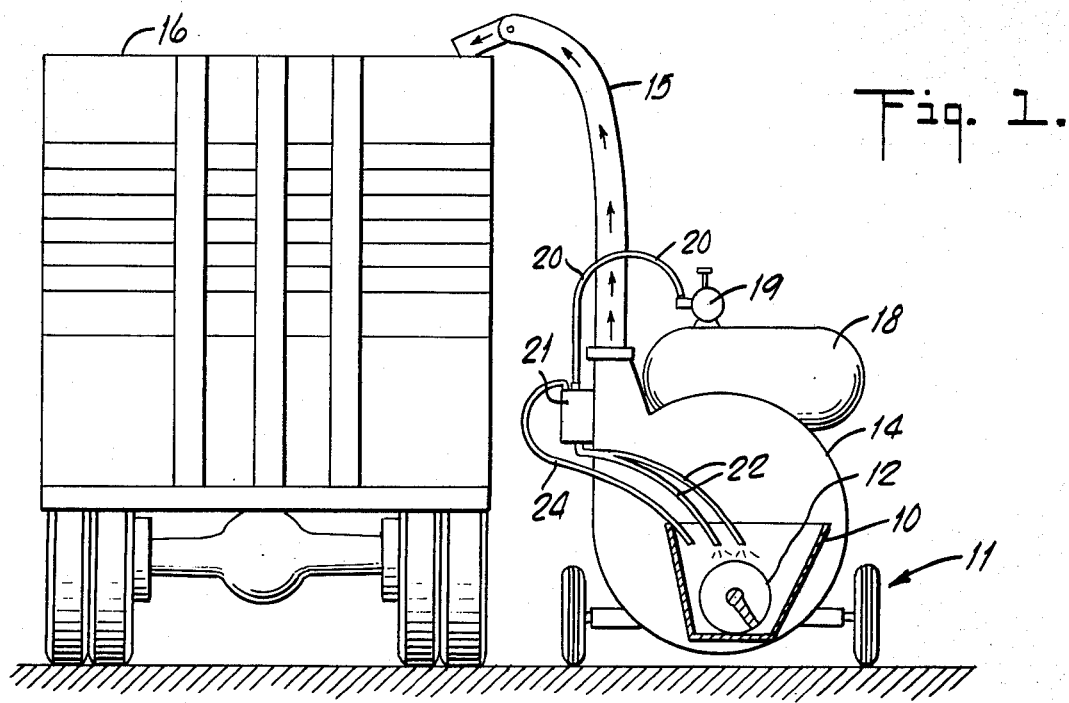
Fig. 1.
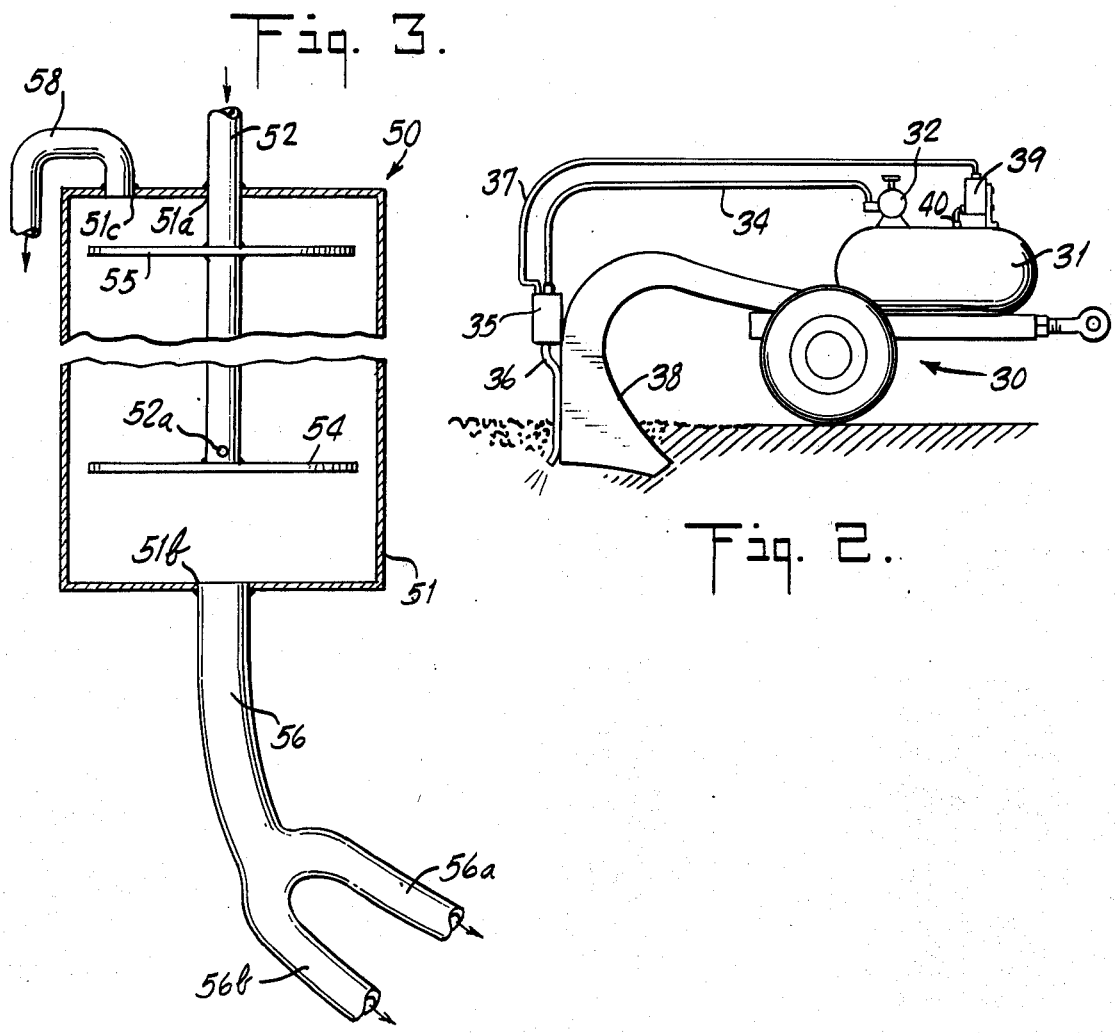
Fig. 3.
Fig. 2.

METHOD AND APPARATUS FOR THE ADIABATIC EXPANSION OF LIQUID ANHYDROUS AMMONIA

This invention relates to the utilization of ammonia for agricultural purposes. One aspect of this invention relates to the utilization of ammonia as a soil fertilizer. Another aspect of this invention relates to the utilization of ammonia in the treatment of feed grains, forages and silage material to provide therein non-protein nitrogen (NPN). Still another aspect of this invention involves the utilization of anhydrous ammonia in the treatment of agricultural products, including small grains, corn, hay and the like prior to storage to prevent spoilage, such as spoilage due to fungi.

Ammonia in the form of an aqueous solution has been applied to anaerobically fermentable plant material for silage production to provide feed for ruminant animals, the applied ammonia being converted to nitrogen compounds providing non-protein nitrogen (NPN) which is consumable by ruminant animals, see particularly U.S. Pat. No. 3,753,723. The disclosures of this patent are herein incorporated and made part of this disclosure.

In the application of aqueous ammonia solutions to animal feed materials, particularly for silage production, it is necessary to provide not only a source of ammonia but also a source of water so as to produce the aqueous ammonia solution. This has necessitated, particularly when the aqueous ammonia solution is applied to the silage material in the field and/or during harvesting of the plant material for silage production, i.e. freshly cut forage, separate containers and tanks of both ammonia and water and associated mixing equipment. Providing separate sources or tanks and the additionally required mixing and handling equipment is a disadvantage.

It is an object of this invention to provide an improved technique for the application and utilization of ammonia for agricultural purposes.

It is another object of this invention to provide an improved technique for the applicaton of ammonia to feed grains and forages for silage production or for treatment of feed grains and forages to prevent spoilage during storage.

Still another object of this invention is to provide a technique for the treatment of feed grains and forages, plant silage materials and the like to provide therein a source of non-protein nitrogen suitable for animal consumption.

Still another object of this invention is to provide apparatus useful for the production of cold anhydrous ammonia at substantially atmospheric pressure from pressurized, ambient temperature, liquid anhydrous ammonia.

How these and other objects of this invention are achieved will become apparent in the light of the accompanying disclosure made with reference to the accompanying drawings wherein:

FIG. 1 schematically illustrates the practice of this invention in the embodiment wherein cold anhydrous ammonia is applied directly to freshly cut forage material before loading in a truck and transportation for storage to produce silage;

FIG. 2 schematically illustrates another embodiment of the practice of this invention wherein cold anhydrous ammonia is applied for soil fertilization; and wherein FIG. 3 illustrates in partial cross-section an apparatus or structure in accordance with this invention for the expansion of a stream of pressurized, liquid, ambient temperature, anhydrous ammonia into two separate streams of cold anhydrous ammonia at substantially ambient or atmospheric pressure, one stream being cold anhydrous gaseous ammonia and the other stream being cold liquid anhydrous ammonia.

In at least one embodiment of the practice of this invention, at least one of the foregoing objects will be achieved.

In accorance with this invention it has been found that anhydrous amonia is advantageously utilized for agricultural purposes, such as for applicaton to feed grains, forages and anaerobically fermentable plant material for silage purposes to provide non-protein nitrogen (NPN) therein, for soil fertilization and for the protection of small grains, corn, hay and the like from spoilage during storage, when the ammonia is applied in the form of cold anhydrous ammonia, preferably cold anhydrous liquid ammonia, at substantially atmospheric pressure. The cold anhydrous ammonia, preferably in liquid form, and at substantially ambient or atmospheric pressure, is utilized or applied, in accordance with the practices of this invention, at a temperature in the range from about −30°F. to about −17°F., substantially corresponding to stable liquid anhydrous ammonia at atmospheric or ambient pressure, such as a pressure range of about 1 pound per square inch below atmospheric pressure up to about 5 pounds per square inch above atmospheric pressure.

By applying or utilizing the anhydrous ammonia in cold, preferably liquid, form at substantially atmospheric pressure, it has been found that losses of ammonia due to volatilization are substantially reduced because of the low temperature at which the ammonia is applied and because the materials to which the ammonia is applied usually contain sufficient water for substantially complete absorption of the applied cold ammonia, especially when applied in liquid form. The application of the ammonia in cold liquid form at substantially atmospheric pressure overcomes the disadvantages indicated hereinabove previously experienced with the utilization of anhydrous ammonia for agricultural purposes when the anhydrous ammonia was employed at substantially ambient temperature, usually in gaseous form, and at substantial pressures above atmospheric pressure, such as 100 psig and more. The application of anhydrous ammonia, particularly in gaseous form, under such conditions permitted the escape of the applied ammonia with resulting ammonia losses to the atmosphere, which ammonia also served as a source of pollution and irritation and potential injury to those working in the vicinity.

The cold anhydrous ammonia is obtained in accordance with this invention by supplying a stream of ambient temperature, pressurized, liquid anhydrous ammonia to an expansion chamber for expansion therein. The expansion of the ambient temperature, pressurized, liquid anhydrous ammonia supplied to the expansion chamber is carried out under substantially adiabatic conditions, that is, under conditions such that substantially no heat is added to the ammonia during the expansion operation. If the expansion chamber is not adequately insulated, some frost will build up on the outside surface thereof in contact with the air. This frost would also serve as an insulator. Aside from such heat as may be picked up by the expanding ammonia from contact with the walls of the expansion chamber, substantially no heat would otherwise be added to the expanding ammonia. By operating the expansion chamber under substantially adiabatic conditions, there would be produced within the expansion chamber cold liquid anhydrous ammonia and cold gaseous anhydrous ammonia, usually at a temperature in the range from about −30°F. to about −17°F. Due to the high heat of evaporation of ammonia a substantially, e.g. major amount, about 80% by weight, of the ammonia supplied to the expansion chamber will be converted to cold stable liquid anhydrous ammonia.

The expansion chamber in accordance with this invention is operated at substantially atmospheric pressure. The supply of pressurized liquid anhydrous ammonia at ambient temperature, such as a temperature in the range 50°–110°F., to the expansion chamber is at a rate such that at least a major amount, e.g. greater than 50% by weight, preferably more than 80% by weight, of the pressurized ambient temperature liquid ammonia supplied to the expansion chamber is expanded to yield cold liquid anhydrous ammonia.

Reference is now made to the drawings particularly to FIG. 1 thereof wherein there is illustrated one embodiment of the practices of this invention wherein a mixture of cold gaseous anhydrous ammonia and cold liquid anhydrous ammonia at a temperature in the range from about −30°F. to about −17°F., such as a temperature of about −28°F., is applied at substantially atmospheric pressure to freshly cut or harvested plant material suitable for silage production. As illustrated, conveyor body 10 carried on toward or self-propelled wheeled vehicle, generally indicated by reference numeral 11, is provided with an endless conveyor 12, such as a helical disc conveyor. Conveyor 12 serves to transport the plant material added to conveyor body 10 to blower 14 for discharge via chute 15 into truck 16 for transport to the silo for storage of the plant material for silage production.

The plant material put into conveyor body 10 has applied thereto cold, atmospheric pressure anhydrous ammonia in accordance with this invention. Ammonia is supplied from tank 18 carried on vehicle 11. Tank 18 contains pressurized liquid anhydrous ammonia at substantially ambient temperature, such as a temperature in the range 50°–110°F., more or less, depending upon the environment. Pressurized liquid ammonia leaves tank 18 through adjustable control valve 19 and conduit 20 and enters expansion chamber 21. The pressurized ambient temperature liquid anhydrous ammonia is supplied to an adiabatically expanded within expansion chamber 21 at a rate such that a major amount of the supplied pressurized ambient temperature liquid anhydrous ammonia is converted to a major amount of cold anhydrous liquid ammonia at substantially atmospheric pressure, with the remaining minor amount being converted to cold gaseous anhydrous ammonia.

The cold liquid anhydrous ammonia at substantially atmospheric pressure leaves expansion chamber 21 via outlet pipes 22 and the cold gaseous anhydrous ammonia at substantially atmospheric pressure leaves expansion chamber 21 via outlet pipes 24. The cold liquid anhydrous ammonia and the cold gaseous anhydrous ammonia issuing from expansion chamber 21 via outlet pipes 22 and 24, respectively, are discharged directly into contact with and/or applied directly onto the plant material being handled and conveyed within conveyor body 10 for discharge via blower 14 and chute 15 into truck 16.

In FIG. 2 there is illustrated another embodiment of the practice of this invention wherein a wheeled towed trailer, generally indicated by reference numeral 30, which carries tank 31 of pressurized liquid anhydrous ammonia at substantially ambient or atmospheric temperature. As described in connection with FIG. 1, a stream of pressurized ambient temperature anhydrous liquid ammonia is supplied via adjustable control valve 32 associated with tank 31 and supply line 34 to expansion chamber 35 for expansion of the supplied stream of ambient temperature liquid ammonia therein under adiabatic conditions.

There is discharged from expansion chamber 35 via line 36 a stream of cold liquid anhydrous ammonia at substantially ambient or atmospheric pressure. As illustrated, this stream of cold liquid anhydrous ammonia is discharged beneath the surface of the round into a furrow or opening cut into the surface of the ground by plow 38 fixed to and towed by wheeled vehicle 30. Substantially as soon as the cold anhydrous liquid ammonia is thus-applied beneath the surface of the ground it is covered over with soil and the moisture in the soil serves to rapidly absorb the applied ammonia with the result that little, if any, ammonia is lost to the atmosphere.

In accordance with one feature of the invention embodied in FIG. 2 cold gaseous anhydrous ammonia is recovered from expansion chamber 35 via line 37 and supplied to compressor 39 mounted on tank 31 for compression into liquid ammonia which is then returned to tank 31 from compressor 39 via line 40. As illustrated, only cold liquid anhydrous ammonia at a temperature in the range from about −30°F. to about −17°F. and at substantially atmospheric pressure is supplied to the soil.

Reference is now made to FIG. 3 of the drawings which illustrates in partial cross section one embodiment of an expansion chamber useful in accordance with the practices of this invention for the adiabatic expansion of ambient temperature pressurized liquid anhydrous ammonia. As illustrated, the expansion chamber, generally indicated by reference numeral 50, comprises a closed chamber or container 51 provided with an inlet opening 51a and discharge openings 51b and 51c. Although chamber or container 51 is illustrated as being substantially cylindrical in shape, any suitable shape, cubical or spherical or the like, would be satisfactory. Inlet opening 51a has passing therethrough and welded and fixed thereon inlet pipe 52, one end of which, as illustrated, terminates at the opposite end of chamber 51 in fairly close proximity to outlet opening 51b. The end of inlet pipe 52 within container 51 is closed with baffle plate 54 welded thereto. One or more openings 52a are provided at the end of inlet pipe 52 adjacent or close to baffle plate 54. At least another baffle plate 55 fixed to pipe 52 is provided at the other end of container 51 in close proximity to outlet opening 51c. Conduit or pipe 56 is welded and fixed to outlet 51b and is in communication with the interior of chamber 51. As illustrated, conduit 56 is provided with one or more branch conduits 56a and 56b. Also, as illustrated, conduit 58 is welded and fixed to outlet 51c and communicates with the interior of chamber 51 via outlet opening 51c.

Conduit 58 serves for the discharge of the expanded gaseous cold anhydrous ammonia from the interior of container 51 and conduit 56 serves for the discharge of cold anhydrous ammonia from the interior of chamber 51. Baffle plates 54 and 55 which extend outwardly toward and close to the inner periphery of container 51 provide an annulus or annular space between baffle plates 54 and 55 and the interior of container 51 and serve to effect a better separation between the cold gaseous anhydrous ammonia and the cold liquid anhydrous ammonia within chamber 51.

In the operation of the expansion chamber 50 pressurized liquid ambient temperature anhydrous ammonia, such as ammonia at a temperature in the range 30°–100°F., e.g. about 60 °F., is supplied via pipe 52 and is discharged for expansion within container 51 via openings 52a just above the lower baffle plate 54. In operation the pressure within container 51 is substantially atmospheric or essentially zero psig. The expansion of the pressurized liquid ammonia introduced into container 51, due to the relatively high heat of evaporation of ammonia, produces therein cold, stable liquid anhydrous ammonia. Two streams leave expansion chamber 50 or container 51, one stream being cold liquid anhydrous ammonia at substantially atmospheric pressure via line 56 and the other stream being cold gaseous anhydrous ammonia at substantially atmospheric pressure via line 58. Generally, the flow of gaseous or vaporized ammonia from container 51 is directly proportional to the ammonia cooling requirements plus the expansion chamber heat gain from surrounding environment of air. Under steady state conditions of operation container 51 becomes insulated with frost. Due to the high heat of evaporation of ammonia the gaseous ammonia flow from container 51 via conduit 58 will normally be less than 20% of the total mass flow of ammonia from container 51. Cold stable liquid anhydrous ammonia at substantially atmospheric pressure and at a temperature of about −28°C. tends to collect at the bottom of container 51 and is discharged therefrom via outlet opening 51b and discharge pipe or conduit 56 and flows by gravity into the distribution system in fluid communication with branch conduits 56a and 56b for discharge as a stable liquid stream of cold anhydrous ammonia at substantially atmospheric pressure into the material being treated. The amount of cold liquid anhydrous ammonia discharged from container 51 via outlet 51b and conduit 56 will normally be about 80% or more by weight of the ammonia flow from container 51.

The hereindescribed cold flow method for the application of anhydrous ammonia for agricultural purposes in accordance with this invention has great versatility. One outstanding advantage of the practice of this invention is the improved safety and efficiency of applying anhydrous ammonia as a soil fertilizer or as a feed or forage additive or for the protection of stored grains and animal food and the like to prevent spoilage. By suitable operation of the expansion chamber there is produced varying ratios of cold liquid anhydrous ammonia relative to cold gaseous anhydrous ammonia, both being at substantially atmospheric pressure, issuing from the expansion chamber. Generally, it is preferred that the weight ratio of the liquid to gaseous ammonia be in the range 2–8:1, the gaseous and liquid ammonia streams being at a temperature in the range −20°F. to about −17°F., preferably at a temperature of about −28°F., the temperature corresponding to the temperature of stable liquid ammonia at atmospheric pressure. Since the cold liquid ammonia is produced at atmospheric pressure it flows by gravity to the release point into contact with the material being treated where it is discharged at low pressure and velocity resulting in improved safety and utilization of the applied ammonia. Since the applied ammonia is cold, below about −17°F., about −28°F., the escape and loss of the applied ammonia to the surrounding environment is reduced and the applied ammonia is more readily trapped and absorbed by the material, plant, grain material or the soil, being treated. In this connection the ammonia retention rates in connection with silage production, even involving the application of cold liquid ammonia to silage material just before loading into silos, is equal to ammonia retention rates achievable when ammonia dissolved in water is added for silage production.

When cold anhydrous ammonia is added to corn silage in accordance with this invention the crude protein is increased from 8% to about 13%. The results of tests carried out involving the treatment of silage with cold liquid ammonia in accordance with the practices of this invention show that the efficiency of recovery of nitrogen of the ensiled is about 80%. In tests carried out in accordance with this invention the protein content of the untreated silage amounted to 7.95% of DM and with ammonia addition in accordance with this invention the protein equivalent amounted to 11.47% of DM. The amount of ammonia applied was 6.6 pounds per ton and the amount of retained nitrogen and ammonia per ton amounted to 4.2 and 5.1 pounds, respectively. In terms of feeding value to ruminants one part nitrogen is equivalent to 6.25 parts crude protein. As a source of nitrogen, ammonia is composed of 82% by weight nitrogen. Accordingly, when a farmer adds an amount of anhydrous ammonia corresponding to 1% by weight of the silage on a dry weight basis he is adding 0.82% nitrogen. This amount corresponds to an increase of approximately 5% crude protein in the silage.

Desirably, all the ammonia is utilized as cold liquid ammonia. When the ammonia in accordance with this invention is added as a preservative to high moisture packaged hay, data indicates that the ammonia will preserve hay quality. In the application of the cold liquid ammonia to hay in accordance with this invention the cold liquid ammonia would be deposited on top of the hay windrow either just prior to baling machine pickup or during the machine function. This provides good distribution of ammonia throughout the hay mass. A 1% ammonia treatment based on 25% moisture hay for typical hay yields would be adequate.

As indicated hereinabove anhydrous ammonia is useful as a preservative of the organic material, such as small grains, corn, hay and the like, where the moisture content and other properties will not support fermentation for silage production. Ammonia has proven toxic to many fungi causing spoilage. In this connection the application of cold ammonia in accordance with this invention as a preservative to prevent spoilage due to fungi and the like is particularly useful. Ammonia has also been proven to be a detoxifier of certain mycotoxins. For example, ammonia has removed aflatoxin from wet corn grain.

Cold flow or cold liquid anhydrous ammonia produced in accordance with this invention is useful as a feed grain additive, as an alternative protein source for ruminants, i.e. as a source of NPN. The applied anhydrous ammonia could meet one-third of the protein need in cattle feeding. This is particularly significant when natural proteins are in short supply or are expensive.

As will be apparent to those skilled in the art in the light of the foregoing disclosure, many modifications, alterations and substitutions are possible in the practice of this invention without departing from the spirit or scope thereof.

We claim:

1. A expansion chamber useful for the substantially adiabatic expansion of ambient-temperature, pressurized anhydrous liquid ammonia to produce separate streams of cold ambient or atmospheric pressure gaseous anhydrous ammonia and liquid anhydrous ammonia comprising a closed expansion chamber provided with two outlets, one outlet being useful for the withdrawal of cold gaseous anhydrous ammonia and the other outlet being useful for the withdrawal of cold anhydrous liquid ammonia, said outlet for the withdrawal of gaseous ammonia being located at one end of said chamber and said other outlet for the withdrawal of liquid ammonia being positioned at the other end of said chamber, conduit means associated with said expansion chamber for introducing thereinto a stream of ambient-temperature, pressurized liquid anhydrous ammonia for expansion therein to produce cold gaseous ammonia and cold liquid ammonia at substantially ambient or atmospheric pressure, said conduit means for the introduction of said stream of ambient-temperature, pressurized liquid ammonia into said expansion chamber being provided with an outlet, said outlet being positioned intermediate said gaseous ammonia and said liquid ammonia outlets, a first baffle plate fixed to said conduit means below said outlet provided by said conduit means, said first baffle plate providing a first annular space between the periphery thereof and the inside of said expansion chamber and a second baffle plate fixed to said conduit means, said second baffle plate providing a second annular space between the periphery thereof and the inside of said expansion chamber and being fixed to said conduit means and located within said expansion chamber intermediate the outlet for gaseous ammonia and said outlet provided by said conduit means.

2. An expansion chamber in accordance with claim 1 including conduit means in communication with said one outlet for the withdrawal of cold gaseous anyhydrous ammonia at substantially ambient or atmospheric pressure from said expansion chamber, means for compressing and liquefying the withdrawn cold gaseous ammonia and conduit means for supplying the resulting liquefied ammonia to said expansion chamber for adiabatic expansion therein together with said stream of ambient-temperature pressurized liquid anhydrous ammonia.

3. A method for carrying out the substantially adiabatic expansion of a pressurized stream of ambient-temperature liquid anhydrous ammonia to produce a stream of cold liquid anhydrous ammonia at substantially ambient or atmospheric pressure and a stream of cold anhydrous ammonia at substantially ambient or atmospheric pressure, which comprises introducing a stream of ambient-temperature, pressurized liquid anhydrous ammonia into an expansion zone provided with one outlet useful for the removal of gaseous anhydrous ammonia therefrom and another outlet useful for the removal of cold liquid anhydrous ammonia therefrom, said outlets being provided at opposite ends of said expansion zone, interrupting the flow of the introduced stream of pressurized ambient-temperature liquid ammonia within said expansion zone by providing a first flow-interrupting means or baffle therein between the place of introduction of said pressurized liquid ambient-temperature anhydrous ammonia within said expansion zone and said outlet useful for the withdrawal of cold ambient or atmospheric pressure liquid ammonia from said expansion zone to effect separation between cold liquid ammonia and cold gaseous ammonia within said expansion zone, providing a second flow-interrupting means or baffle within said expansion zone between said first flow-interrupting means and said outlet useful for the removal of gaseous anhydrous ammonia but above the place of introduction of said ambient-temperature pressurized liquid ammonia into said expansion zone and substantially simultaneously withdrawing from said expansion zone a stream of cold gaseous anhydrous ammonia at substantially ambient or atmospheric pressure via said one outlet and a stream of cold liquid anhydrous ammonia at substantially ambient or atmospheric pressure via said other outlet.

4. A method in accordance with claim 3 wherein the cold gaseous ammonia withdrawn from said expansion zone via said one outlet is compressed and liquefied for recycle to said expansion zone together with said ambient-temperature pressurized liquid anhydrous ammonia.

* * * * *